(12) United States Patent
Zhang (10) Patent No.: US 9,261,415 B1
(45) Date of Patent: Feb. 16, 2016

(54) SYSTEM AND METHOD FOR TEMPERATURE SENSING

(71) Applicant: Infineon Technologies AG, Neubiberg (DE)

(72) Inventor: Cheng Zhang, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/492,882

(22) Filed: Sep. 22, 2014

(51) Int. Cl.
 *G05F 1/10* (2006.01)
 *G01K 7/01* (2006.01)
 *G05F 3/16* (2006.01)

(52) U.S. Cl.
 CPC ... *G01K 7/01* (2013.01); *G05F 3/16* (2013.01)

(58) Field of Classification Search
 CPC ............. G01K 7/01; G01K 7/015; G05F 3/30
 See application file for complete search history.

(56) References Cited

U.S. PATENT DOCUMENTS

| | | | |
|---|---|---|---|
| 6,456,145 B1 | 9/2002 | Pertijs et al. | |
| 7,224,210 B2 * | 5/2007 | Garlapati | G05F 3/267 327/539 |
| 8,026,756 B2 * | 9/2011 | Yuasa | G05F 3/30 327/539 |
| 8,547,165 B1 * | 10/2013 | Bernardinis | G05F 3/30 327/513 |
| 8,648,648 B2 * | 2/2014 | Choi | G05F 3/30 323/313 |
| 8,723,595 B1 * | 5/2014 | Chen | G05F 3/30 327/538 |

OTHER PUBLICATIONS

Ge, G., et al., "A Single-Trim CMOS Bandgap Reference With a 3s Inaccuracy of ±0.15% From -40° C. to 125° C.," IEEE Journal of Solid-State Circuits, vol. 46, No. 11, Nov. 2011, pp. 2693-2701.
Makinwa, K., "Designing Precision Band-Gap Circuits: less is More," Electronic Instrumentation Laboratory/DIMES, TUDelft, AMP-S Design Symposium, Mar. 2012, 53 pages.
Malcovati, P., et al., "Curvature-Compensated BiCMOS Bandgap with 1-V Supply Voltage," IEEE Journal of Solid-State Circuits, vol. 36, No. 7, Jul. 2001, pp. 1076-1081.

* cited by examiner

*Primary Examiner* — Jeffrey Zweizig
(74) *Attorney, Agent, or Firm* — Slater & Matsil, L.L.P.

(57) ABSTRACT

In accordance with an embodiment, a temperature sensor includes a proportional to absolute temperature (PTAT) current generator having a first current output configured to provide a first temperature dependent current, a first curvature compensation circuit configured to provide a first compensating current to an internal node of the PTAT current generator, and a second curvature compensation circuit configured to add a second compensating current to the first current output. The first compensating current has a first non-linearity with respect to temperature, a portion of the first non-linearity is present in the first temperature dependent current, the second compensating current includes a second non-linearity with respect to temperature, such that the second non-linearity in the second compensating current substantially cancels out the first non-linearity in the first temperature dependent current.

23 Claims, 5 Drawing Sheets

*FIG. 5*

SYSTEM AND METHOD FOR TEMPERATURE SENSING

TECHNICAL FIELD

The present disclosure relates generally to an electronic device, and more particularly to a system and method for temperature sensing.

BACKGROUND

Temperature sensors are commonly used in a variety of applications including thermostats for homes and for industrial use, safety systems, automotive systems, as well as various self-monitoring electronic systems. For example, a temperature sensor may be included on a same die as other electronic circuitry in order to detect increases in ambient temperature. When a high temperature is detected using such a temperature sensor that exceeds a particular limit, the system may take protective action such as shutting down the entire system or portions of the system. Temperature sensors may be further included in integrated circuits, such as a CPU to provide the temperature information for the whole IC for the purpose of thermal management. This information may be used by the integrated circuit to adjust parameters to improve the performance of the circuit over a certain temperature range.

Temperature sensors may be constructed in a variety of ways. For example, a temperature sensor may be constructed using a bi-metallic strip using two metals having different thermal expansion coefficients. The mechanical deflection of such a bi-metallic strip serves as an indication of the temperature of the bi-metallic stip.

Another way to implement a temperature sensor is electronically using solid state circuitry. For example, the junction voltage of a diode, which has an almost linear temperature dependency with negative slope, may be used to provide a measure of temperature.

In another example, a voltage difference between two diodes having two current densities may also be used to measure temperature. A circuit that uses such a voltage difference is commonly referred to as a proportional to absolute temperature (PTAT) generator, and produces an output signal that has linear temperature dependency with positive slope. To provide a digital output which is related to absolute temperature, a reference voltage is compared to an output signal of the PTAT generator. This reference voltage is expected to be temperature independent, and is typically derived from the PTAT generator by combining a junction voltage of diode and a scaled voltage difference between the two diodes. However, since the junction voltage of diode has some nonlinearity with respect to temperature, the resulting reference voltage has a nonlinear temperature dependency that produces a nonlinearity at temperature sensor's digital output.

SUMMARY OF THE INVENTION

In accordance with an embodiment, a temperature sensor includes a proportional to absolute temperature (PTAT) current generator having a first current output configured to provide a first temperature dependent current, a first curvature compensation circuit configured to provide a first compensating current to an internal node of the PTAT current generator, and a second curvature compensation circuit configured to add a second compensating current to the first current output. The first compensating current has a first non-linearity with respect to temperature, a portion of the first non-linearity is present in the first temperature dependent current, the second compensating current includes a second non-linearity with respect to temperature, such that the second non-linearity in the second compensating current substantially cancels out the first non-linearity in the first temperature dependent current.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a temperature sensing circuit. Embodiments of the present invention may also be applied toward various systems that utilize temperature sensing circuits, other sensing circuits, and circuits directed toward linearizing non-linear behavior.

In an embodiment, temperature sensor utilizes a curvature corrected a proportional to absolute temperature (PTAT) current generator to provide a current that is linearly related to temperature. In an embodiment, a first set of curvature correction currents are added to a core of the PTAT current generator in order to provide a curvature corrected bandgap voltage. An additional curvature correction current is applied to an output current of the PTAT generator to further cancel out the residual non-linearity of current v. temperature caused by the first set of curvature corrections currents. In some embodiments, the output of the PTAT current generator is applied to an analog to digital converter in order to provide a digital output value indicative of temperature.

Conventional temperature sensors may sense a temperature by measuring a PTAT voltage, which is proportional to a voltage difference between two diodes or two base-emitter junctions (ΔVbe) having different current densities. This PTAT voltage may be compared to a reference voltage that is generated using a bandgap voltage reference. Due to the nonlinear temperature dependency of the diode junction and/or base-emitter voltage (Vbe) of bipolar transistor, the bandgap voltage has a curvature over temperature.

One way to compensate the curvature of bandgap reference is to inject another signal with the same nonlinear temperature dependency as that of Vbe in order to cancel the nonlinear item of the bandgap voltage. Such compensation may be achieved by introducing one or few diodes or bipolar transistors biased with a temperature independent (TI) current. Consequently, the nonlinear item of Vbe is reproduced by combining the Vbe biased with PTAT current with the Vbe biased with the TI current, and then generating a nonlinear signal that is fed to the bandgap core. However, this additionally introduced nonlinear signal also appears in the PTAT signal (typically a ΔVbe related current) that is obtained from the bandgap circuit to indicate temperature information. As a result, this approach removes the curvature in the bandgap voltage, but introduces curvature in the temperature dependent PTAT signal.

Figure 1:
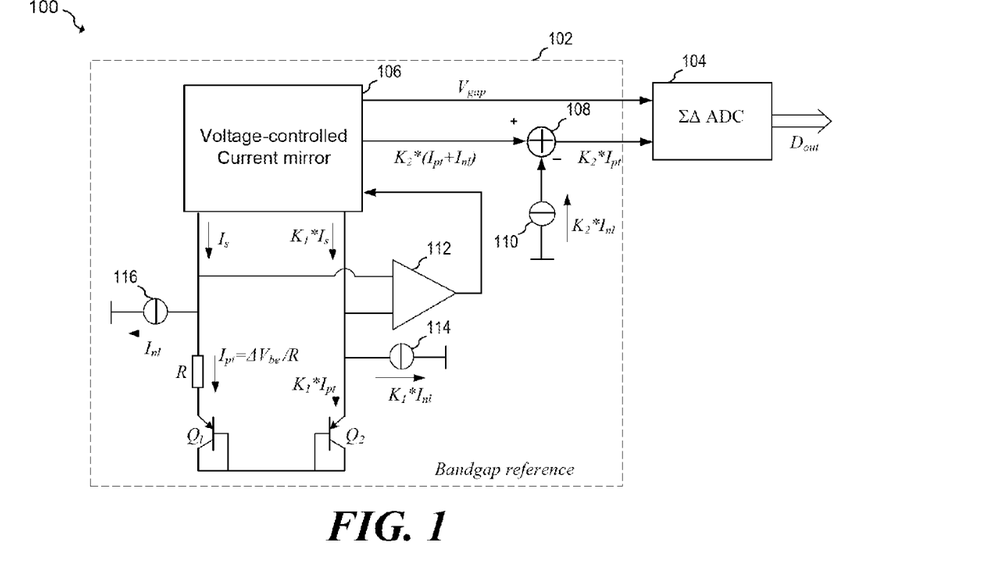
FIG. 1 illustrates an embodiment temperature sensing system.

FIG. 1 illustrates temperature sensing system 100 according to an embodiment of the present invention in which a temperature measurement is made by measuring a ratio between a PTAT signal (proportional to ΔVbe) and a bandgap reference voltage. As shown, temperature sensing system 100 includes bandgap reference 102 having an output coupled to analog to digital converter 104. In an embodiment, analog to digital converter 104 is implemented using a sigma-delta analog to digital converter. In alternative embodiments, other analog to digital converter architectures besides sigma-delta converter may be used.

Bandgap reference 102 includes bipolar transistors $Q_1$ and $Q_2$, resistor R, operational amplifier 112, and voltage controlled current mirror 106. During operation, operational amplifier 112 forces the base-emitter voltage of bipolar transistor $Q_2$ to be about equal to the sum of the base-emitter voltage of bipolar transistor $Q_1$ and the voltage drop across resistor R. In one example, the output of operational amplifier 112 is coupled to the input of a source follower whose output determines the voltage across one or more resistors within a current mirror. In some embodiments, bipolar transistor $Q_1$ has a larger emitter area than bipolar transistor $Q_2$ and or current $I_{pt}$ through bipolar transistor $Q_1$ is smaller than current $K_1*I_{pt}$ flowing through bipolar transistor $Q_2$ such that bipolar transistor $Q_1$ has a lower current density than bipolar transistor $Q_2$. $K_1$ is a scaling factor between the current though bipolar transistor $Q_1$ and bipolar transistor $Q_2$. The resulting current through bipolar transistor $Q_1$ is $I_{pt}$, and the resulting current through bipolar transistor $Q_2$ is $K_1*I_{pt}$.

Voltage controlled current mirror 106 further produces temperature stable bandgap voltage Vgap. In an embodiment, the nonlinearity or curvature of the bandgap voltage Vgap with respect to temperature is compensated by summing compensation currents $I_{nl}$ from current sources 116 and $K_1 I_{nl}$ from current source 114. Accordingly, voltage controlled current mirror 106 produces a temperature dependent current $K_2*Is=K_2*(I_{pt}+I_{nl})$ that is proportional to a sum of current $I_{pt}$ that flow through bipolar transistor $Q_1$ and compensation current $I_{nl}$, where $K_2$ is a current mirror ratio. Because the non-linear compensation current term $I_{nl}$ is present in the current $K_2*(I_{pt}+I_{nl})$ produced by voltage controlled current mirror 106, this current is non-linear with respect to temperature. In an embodiment, this non-linear current term $I_{nl}$ is compensated by subtracting current $K_2*I_{nl}$ produced by current source 110, such that the resulting current is $K_2*I_{pt}$. This subtraction operation is represented by summing junction 108 that maybe implemented using various methods of summing and subtracting signals known in the art.

Figure 2:
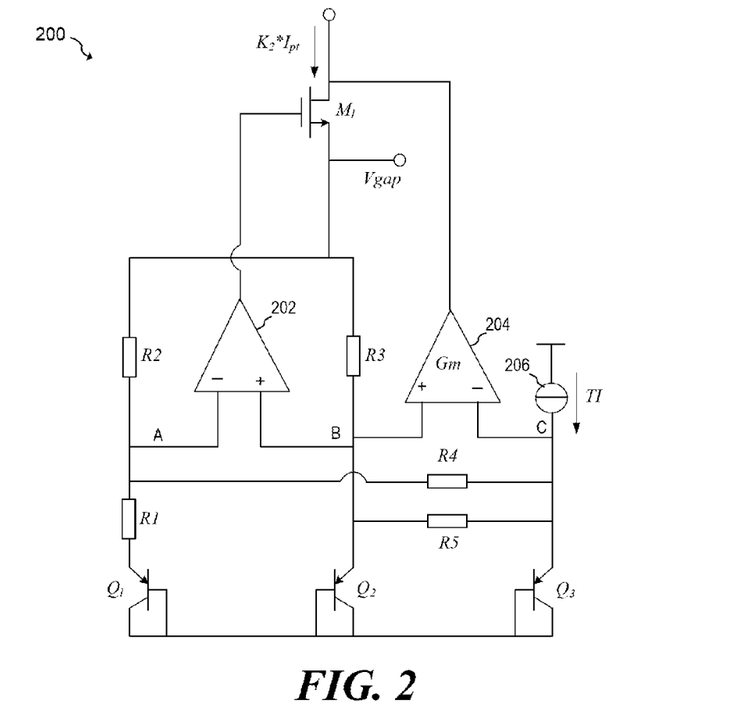
FIG. 2 illustrates an embodiment temperature sensing circuit.

FIG. 2 illustrates a temperature sensor circuit 200 according to a further embodiment. As shown, temperature sensor circuit 200 includes a PTAT current generator that includes bipolar transistor $Q_1$, bipolar transistor $Q_2$, resistors R1, R2 and R3, operational amplifier 202 and transistor $M_1$. During operation, operational amplifier 202 forces the voltage at node A to be approximately equal to the voltage and node B, therefore causing a current that is proportional to temperature to flow through bipolar transistors $Q_1$ and $Q_2$. The voltage at node B is the base-emitter voltage of bipolar transistor $Q_2$ and is complementary to absolute temperature (CTAT), whereas the voltage across resistor R3 is proportional to temperature because a PTAT current flows through it. In some embodiments, the various components are sized and selected such that voltage Vgap is substantially constant over temperature. It should be noted that the various components may be sized such that the current through bipolar transistor $Q_1$ is not equal to the current through bipolar transistor $Q_1$. This difference between currents, as expressed as factor $K_1$ above with respect to FIG. 1, may be determined by the ratio between resistors R2 and R3, and the factor $K_2$ discussed above may be expressed as $1+K_1$ in some embodiments.

In an embodiment, the curvature over temperature with respect to bandgap voltage Vgap may be compensated using temperature independent (TI) current source 206, bipolar transistor $Q_3$ and resistors R4 and R5. In some embodiment, TI current source 206 may be implemented by applying bandgap voltage Vgap or a replica thereof to a resistor that tracks resistors R1, R2, R3, R4 and R5 over process. As shown, bipolar transistor $Q_3$ is biased using TI current source 206. Accordingly, the base emitter voltages of bipolar transistors $Q_2$ and $Q_3$ may be expressed as:

$$V_{be2} = V_{g0} - (V_{g0} - V_{be2_{Tr}})\frac{T}{T_r} - (\eta-1)V_T \ln\frac{T}{T_r}$$

$$V_{be3} = V_{g0} - (V_{g0} - V_{be3\_Tr})\frac{T}{T_r} - \eta V_T \ln\frac{T}{T_r}.$$

where T is the device temperature, $T_r$ is a reference temperature, $V_{be2}$ is the base emitter voltage of bipolar transistor $Q_2$, $V_{be2Tr}$ is the base emitter voltage of bipolar transistor $Q_2$ at the reference temperature $T_r$, $V_{be3}$ is the base emitter voltage of bipolar transistor $Q_3$, $V_{be3Tr}$ is the base emitter voltage of bipolar transistor $Q_3$ at the reference temperature $T_r$, $V_T$ is the thermal voltage, $\eta$ is a factor determined by IC technology, and $V_{g0}$ is the bandgap voltage of silicon. The voltage across resistors R4 and R5 may be expressed as:

$$\Delta V_{be23} = (V_{be2\_Tr} - V_{be3\_Tr})\frac{T}{T_r} + V_T \ln\frac{T}{T_r}.$$

Therefore, the nonlinearity of Vbe2 is reproduced in the current through R4 and R5. By appropriately choosing the value of the resistors, the curvature of Vgap originating from the curvature of Vbe2 may be reduced and/or removed. In one embodiment, the following component value ratios may be used:

R4/R5=R2/R3, and

R2/R4=η−1.

Accordingly, the current though resistors R4 and R5 provide curvature compensation to bandgap voltage Vgap. It should be appreciated that other component value ratios may be used in alternative embodiments of the present invention. In alternative embodiments of the present invention, bipolar transistors $Q_1$, $Q_2$, and $Q_3$, may be implemented using diodes and or other devices that have a p-n semiconductor junction.

In an embodiment, nonlinearities in the curvature correction current present in the temperature dependent current at the output of transistor $M_1$ may be compensated by performing a voltage to current conversion of the voltage between nodes B and C and summing the resulting current to the drain of transistor $M_1$. As shown, a voltage-to-current (VI) converter implemented by transconductance amplifier 204 converts $\Delta Vbe_{23}$ into a current and sums this current with the output of the PTAT generator at the drain of transistor $M_1$. In one embodiment, transconductance amplifier 204 has a transconductance of about 1/R4+1/R5. Thus, the output current is about the sum of the currents through R4 and R5. As a result, the final output current $K_2 * I_{pt}$ is the sum of the current through $Q_1$ and $Q_2$, which are purely PTAT.

Figure 3A:
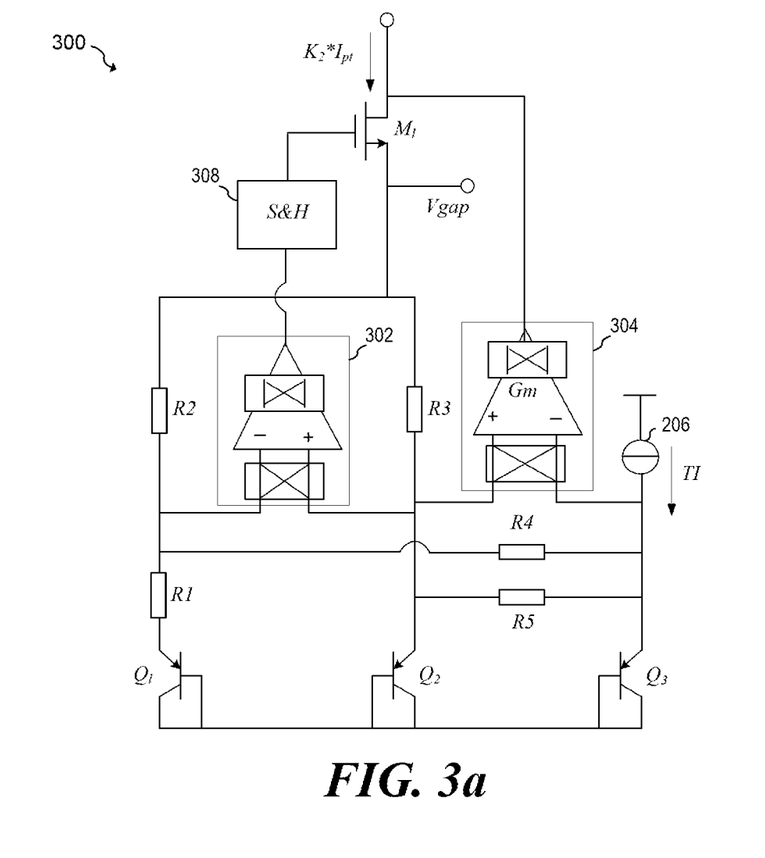
FIG. 3a illustrate an embodiment temperature sensing circuit that utilizes chopped amplifiers.

In an embodiment, further temperature measurement accuracy may be achieved by using chopping in the transconductance amplifier and/or in the operational amplifier to remove its DC offset as shown in FIG. 3a that illustrates temperature sensor circuit 300 according to a further embodiment of the present invention. Temperature sensor circuit 300 is similar to temperature sensor circuit 200 to shown in FIG. 2 with the exception that operational amplifier 302 is implemented as a chopper stabilized amplifier and chopping is implemented for transconductance amplifier 304. Chopper stabilized operational amplifier 302 may be implemented using chopper stabilized amplifier circuits known in the art.

In an embodiment, sample and hold circuit 308 is used to reduce ripple in bandgap voltage Vgap. As shown, a similar sample and hold circuit is not shown at the output of chopper stabilized transconductance amplifier 304. Sample and hold circuit 308 may be implemented using sample and hold circuits known in the art.

Figure 3B:
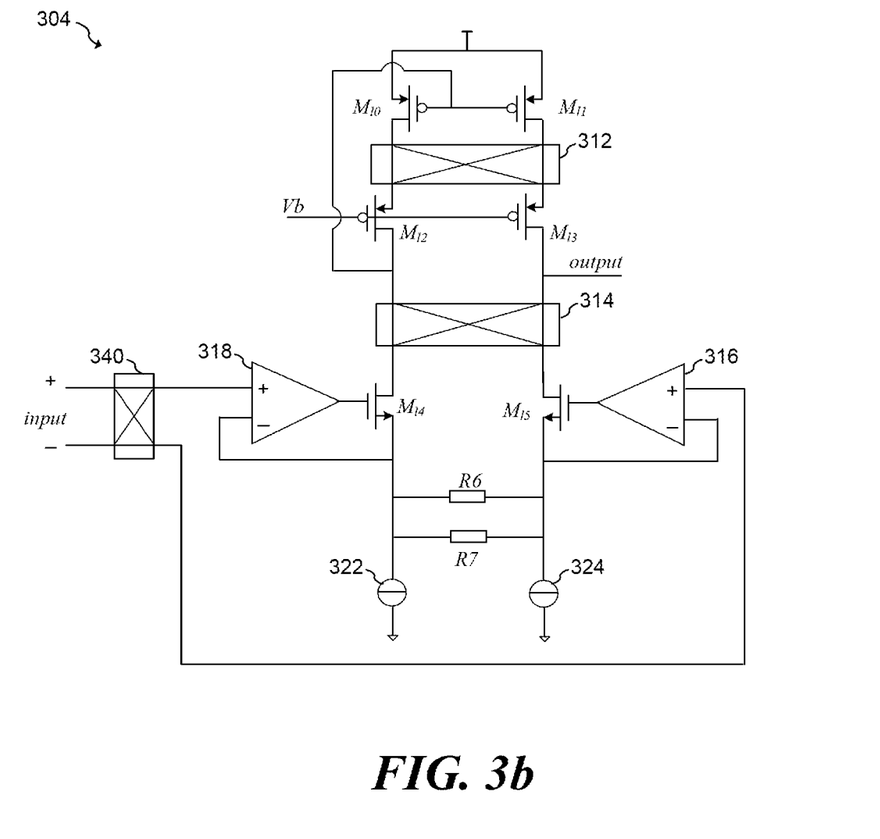
FIG. 3b illustrates an embodiment chopped transconductance amplifier.

FIG. 3b illustrates a schematic of an embodiment chopped transconductance amplifier 304 that may be used, for example, to implement chopped transconductance amplifier 304 depicted in FIG. 3a. As shown, chopped transconductance amplifier 304 includes an input stage that includes NMOS transistors $M_{14}$ and $M_{15}$ coupled to current sources 322 and 324 and degeneration resistors R6 and R7. Accuracy of the transconductance of the input stage is enhanced by placing each of NMOS transistors $M_{14}$ and $M_{15}$ in feedback with operational amplifiers 318 and 316 respectively. For example, the gain of operational amplifier 318 forces the source of NMOS transistor $M_{14}$ to match the voltage at the positive input terminal of operational amplifier 318. Similarly, the gain of operational amplifier 316 forces the source of NMOS transistor $M_{15}$ to match the voltage at the positive input terminal of operational amplifier 316. The drains of NMOS transistors $M_{14}$ and $M_{15}$ are coupled to a cascode current mirror that includes PMOS transistors $M_{10}$, $M_{11}$, $M_{12}$, and $M_{13}$.

An input chopper 340 is coupled between the input of chopped transconductance amplifier 304 and the positive inputs of operational amplifiers 316 and 318, and an output chopping stage 314 is coupled between the drains of NMOS transistors $M_{14}$ and $M_{15}$ and the cascode current mirror. An additional chopping stage 312 is coupled between PMOS cascode transistors $M_{12}$ and $M_{13}$ and PMOS current mirror transistors $M_{10}$ and $M_{11}$ to ensure that the mismatch between the current mirror transistors $M_{10}$ and $M_{11}$ has negligible influence to the overall DC offset of transconductance amplifier 304. It should be appreciated that the illustrated embodiment of chopped transconductance amplifier 304 is just one of many circuits that could be used to implement an embodiment transconductance amplifier. Alternatively, other transconductance amplifier circuits and topologies may be used.

Figure 4:
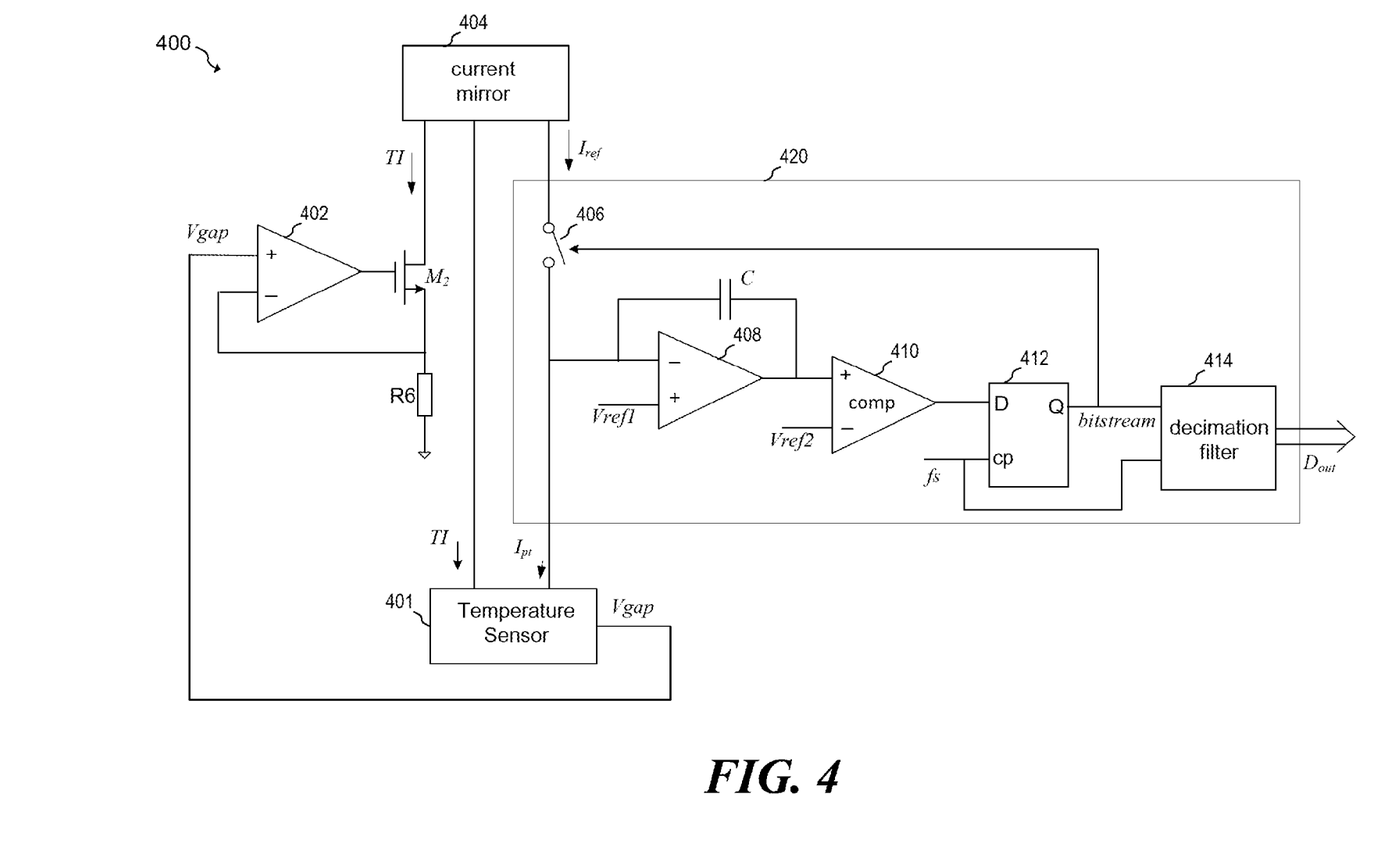
FIG. 4 illustrates a schematic of an embodiment temperature sensing system according to a further embodiment.

FIG. 4 illustrates a temperature measurement system 400 according to an embodiment of the present invention. Temperature measurement system 400 includes embodiment temperature sensor circuit 401 interfaced to sigma-delta analog to digital converter 420. Embodiment temperature sensor circuit 401 may be implemented according to the various embodiment temperature sensor circuits described herein. As shown, temperature sensor circuit 401 provides bandgap voltage Vgap to a voltage to operational amplifier 402, which in conjunction with transistor $M_2$ and resistor R6, converts bandgap voltage Vgap into a substantially temperature independent current TI. Operational amplifier 402 forces the voltage across resistor R6 to be about bandgap voltage Vgap. Accordingly, current TI that flows though transistor $M_2$ may be expressed as Vgap/R6. This current is mirrored back to temperature sensor circuit 401 via current mirror 404 and is used by temperature sensor circuit 401 for curvature compensation as described herein. Current mirror 404 also mirrors current TI to form temperature independent current $I_{ref}$ that is used as a reference current for sigma-delta analog to digital converter 420. In various embodiments, the mirror ratio of current mirror 404 may be set to define the value of $I_{ref}$ so that a full scale of the output code corresponds to a particular temperature. To cancel the mismatch of the current mirror 404, dynamic element matching can be implemented in the current mirror 404 as known in the art.

In an embodiment, sigma-delta analog to digital converter 420 is implemented using a first order modulator implemented using switch 406 operational amplifier 408, comparator 410 and register 412 that is coupled to decimation filter 414. Switch 406 effectively functions as a one-bit digital to analog converter, operational amplifier 408 and capacitor C functions as a continuous time integrator, comparator 410 functions as a one-bit quantizier. The output of register 412 determines whether switch 406 is opened or closed. In alternative embodiments of the present invention, the first order modulator may be implemented using discrete-time circuit. For example, the integrator may be implemented using a switched-capacitor integrated instead of a continuous time integrator. In some embodiments, other modulator architectures known in the art may be used and/or a higher order sigma delta modulator may be used and/or a multi-stage sigma delta modulator may be used.

In an embodiment clock signal fs is use to clock register 412 and decimation filter 414. Decimation filter 414 may be implemented, for example, using a simple comb filter or sinc filter to process the bitstream produced by register 412. Alternatively, other decimation filter structures known in the art may also be used.

In an embodiment, the mirror ratio of current mirror 404 is set to one. Since PTAT current $K_2 * I_{pt}$ from bandgap circuit is used as the input current of the sigma-delta modulator, the percentage of logic "1" in the bitstream is given by:

$$\mu = \frac{R_6 K_2 I_{pt}}{V_{gap}}.$$

Accordingly, the average value produced by decimation filter 414 is propositional to the measured temperature, which may be, for example, an absolute ambient temperature.

Figure 5:
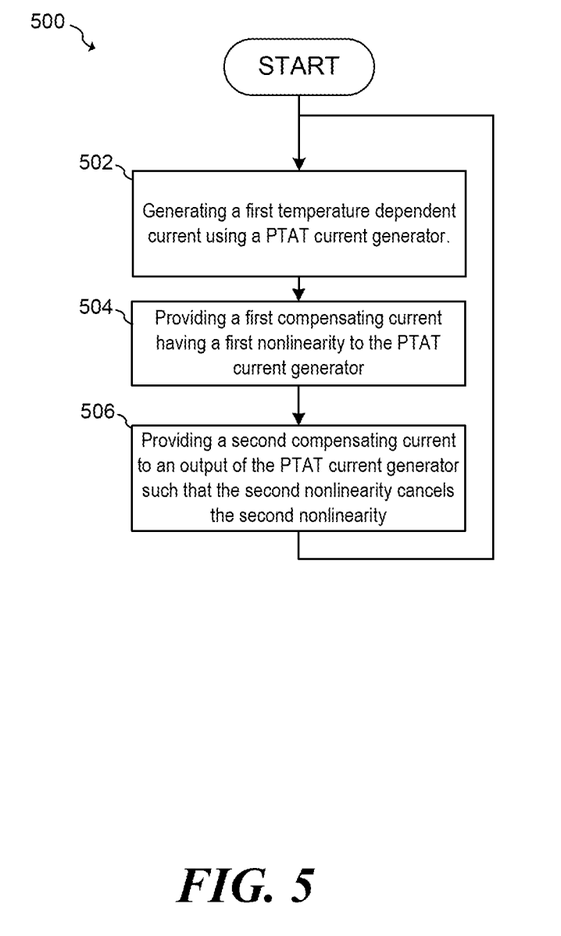
FIG. 5 illustrates a flowchart of an embodiment method.

FIG. 5 illustrates a flowchart of an embodiment method 500 of sensing a temperature. In step 502, a first temperature dependent current is generated using a PTAT current generator. Next, in step 504 a first compensating current having a first nonlinearity with respect to temperature is provided to the PTAT current generator. This first compensating current may be used, for example, to provide curvature correction for a bandgap voltage. In step 506, a second compensating current having a second non-linearity with respect to temperature is provided to an output of the PTAT current generator. In an embodiment, providing this second compensating current includes summing the second compensating current with the first temperature dependent current to provide an output current, such that the second non-linearity in the second compensating current substantially cancels out the first non-linearity.

In accordance with an embodiment, a temperature sensor includes a proportional to absolute temperature (PTAT) current generator having a first current output configured to provide a first temperature dependent current, a first curvature compensation circuit configured to provide a first compensating current to an internal node of the PTAT current generator, and a second curvature compensation circuit configured to add a second compensating current to the first current output. The first compensating current has a first non-linearity with respect to temperature, a portion of the first non-linearity is present in the first temperature dependent current, the second compensating current includes a second non-linearity with respect to temperature, such that the second non-linearity in the second compensating current substantially cancels out the first non-linearity in the first temperature dependent current. The temperature sensor may also include an analog to digital converter having an input coupled to the first current output.

In an embodiment, the PTAT current generator includes a first current branch having a first diode coupled in series with a first resistor, a second current branch having a second diode, an amplifier having inputs coupled to the first and second branches and an output configured to provide current to the first and second branches. The output of the amplifier may be configured to provide a temperature stable bandgap voltage and/or the temperature sensor may further include a transistor coupled to the output of the amplifier, such that a source node of the transistor is coupled to the first current branch and the second current branch, and a drain node of the transistor is coupled to the first current output.

In an embodiment, the first curvature compensation circuit includes a current source coupled to a third diode at a compensation node, a second resistor coupled between the compensation node and the first current branch of the PTAT generator, and a third resistor coupled between the compensation node and second current branch of the PTAT generator. The second curvature compensation circuit may include a transconductance amplifier having a first input coupled to the compensation node and a second input coupled to one of the first current branch and the second current branch of the PTAT generator, and an output coupled to the first current output of the PTAT current generator.

In accordance with a further embodiment, a method of sensing a temperature includes generating a first temperature dependent current using a proportional to absolute temperature (PTAT) current generator, providing a first compensating current to an internal node of the PTAT current generator, and providing a second compensating current comprising a second non-linearity with respect to temperature. The first compensating current includes a first non-linearity with respect to temperature, a portion of the first non-linearity is present in the first temperature dependent current, and providing the second compensation current includes summing the second compensating current with the first temperature dependent current to provide an output current, such that the second non-linearity in the second compensating current substantially cancels out the first non-linearity. The method may further include performing an analog to digital conversion on the output current. Performing this analog to digital conversion may include, for example, using a sigma-delta modulator.

In an embodiment, generating the first temperature dependent current includes using a first amplifier having an output coupled to a first current branch and to a second current branch of the PTAT current generator. The first current branch includes a first diode coupled in series with a first resistor, and the second current branch comprises a second diode. Generating the first compensating current includes using a first curvature compensation circuit having a current source coupled to a third diode at a compensation node, a second resistor coupled between the compensation node and the first current branch of the PTAT generator, and a third resistor coupled between the compensation node and second current branch of the PTAT generator.

In an embodiment, generating the second compensating current includes using a second curvature compensation circuit with a transconductance amplifier having a first input coupled to the compensation node and a second input coupled to one of the first current branch and the second current branch of the PTAT generator, and an output coupled to an output of the PTAT current generator. The method may further include performing chopping on the first amplifier and the transconductance amplifier.

In accordance with a further embodiment, a temperature sensing circuit includes a first current branch having a series circuit having first diode coupled in series with a first resistor, a second current branch that has a second diode, an interface circuit configured to provide a current proportional to a sum of a first current in the first current branch and a second current in the second current branch, a third current branch comprising a third diode, a first amplifier having a first input node coupled to the series circuit, a second input node coupled to the second diode, and a first output node coupled to the first current branch and to the second current branch, and a second amplifier having a third input node coupled to the third diode, a fourth input node coupled to one of the first input node and the second input node of the first amplifier, and a second output node coupled to an output of the interface circuit. In an embodiment, the second amplifier is implemented using a transconductance amplifier. The temperature sensor may also include an analog to digital converter having an input coupled to an output of the interface circuit.

In an embodiment, the temperature sensing circuit further includes a second resistor coupled between the first input node of the first amplifier and the third diode, and a third resistor coupled between the second input node of the first amplifier and the third diode. The interface circuit may include a transistor having a first load path node coupled to the first current branch and the second current branch, and a second load path node coupled to the output of the second amplifier. In some embodiments, the interface circuit is implemented using a current mirror.

According to various embodiments, the first output node of the first amplifier is configured to provide a temperature stable bandgap voltage. The temperature sensing circuit may further include a voltage to current converter circuit having an input coupled to the temperature stable bandgap voltage and an output coupled to the third current branch. In some embodiments, a sample and hold circuit is coupled to an output of the first amplifier. Chopping may be applied to at least one of the first amplifier and the second amplifier.

In an embodiment, the first diode, the second diode and the third diode each comprise a diode connected transistor.

Advantages of some embodiments include the ability to provide an accurate temperature measurement that is linear with temperature. A further advantage of some embodiments includes the ability to generate a highly accurate and linear temperature measurement using simple hardware. In some embodiments, high accuracy may be achieved without using multiple A/D conversion and/or high order digital processing.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A temperature sensor comprising:
a proportional to absolute temperature (PTAT) current generator comprising a first current output configured to provide a first temperature dependent current;
a first curvature compensation circuit configured to provide a first compensating current to an internal node of the PTAT current generator, wherein the first compensating current comprises a first non-linearity with respect to temperature, and a portion of the first non-linearity is present in the first temperature dependent current; and
a second curvature compensation circuit configured to add a second compensating current to the first current output, the second compensating current comprising a second non-linearity with respect to temperature, wherein the second non-linearity in the second compensating current substantially cancels out the first non-linearity in the first temperature dependent current.

2. The temperature sensor of claim 1, wherein the PTAT current generator comprises a first current branch comprising a first diode coupled in series with a first resistor, a second current branch comprising a second diode, an amplifier having inputs coupled to the first and second branches and an output configured to provide current to the first and second branches.

3. The temperature sensor of claim 2, wherein the output of the amplifier is configured to provide a temperature stable bandgap voltage.

4. The temperature sensor of claim 2, further comprising a transistor coupled to the output of the amplifier, wherein a source node of the transistor is coupled to the first current branch and the second current branch, and a drain node of the transistor is coupled to the first current output.

5. The temperature sensor of claim 2, wherein the first curvature compensation circuit comprises a current source coupled to a third diode at a compensation node, a second resistor coupled between the compensation node and the first current branch of the PTAT generator, and a third resistor coupled between the compensation node and second current branch of the PTAT generator.

6. The temperature sensor of claim 5, wherein the second curvature compensation circuit comprises a transconductance amplifier having a first input coupled to the compensation node and a second input coupled to one of the first current branch and the second current branch of the PTAT generator, and an output coupled to the first current output of the PTAT current generator.

7. The temperature sensor of claim 1, further comprising an analog to digital converter having an input coupled to the first current output.

8. A method of sensing a temperature, the method comprising:
generating a first temperature dependent current using a proportional to absolute temperature (PTAT) current generator;
providing a first compensating current to an internal node of the PTAT current generator, wherein the first compensating current comprises a first non-linearity with respect to temperature, and a portion of the first non-linearity is present in the first temperature dependent current; and
providing a second compensating current comprising a second non-linearity with respect to temperature, wherein providing the second compensation current comprises summing the second compensating current with the first temperature dependent current to provide an output current, wherein the second non-linearity in the second compensating current substantially cancels out the first non-linearity.

9. The method of claim 8, further comprising performing an analog to digital conversion on the output current.

10. The method of claim 9, wherein performing the analog to digital conversion comprises using a sigma-delta modulator.

11. The method of claim 8, wherein:
generating the first temperature dependent current comprises using a first amplifier having an output coupled to a first current branch and to a second current branch of the PTAT current generator, wherein the first current branch comprises a first diode coupled in series with a first resistor, and the second current branch comprises a second diode; and
generating the first compensating current comprises using a first curvature compensation circuit comprising a current source coupled to a third diode at a compensation node, a second resistor coupled between the compensation node and the first current branch of the PTAT generator, and a third resistor coupled between the compensation node and second current branch of the PTAT generator.

12. The method of claim 11, wherein generating the second compensating current comprises using a second curvature compensation circuit comprising a transconductance amplifier having a first input coupled to the compensation node and a second input coupled to one of the first current branch and the second current branch of the PTAT generator, and an output coupled to an output of the PTAT current generator.

13. The method of claim 12, further comprising performing chopping on the first amplifier and the transconductance amplifier.

14. A temperature sensing circuit comprising:
a first current branch comprising a series circuit having first diode coupled in series with a first resistor;
a second current branch comprising a second diode;
an interface circuit configured to provide a current proportional to a sum of a first current in the first current branch and a second current in the second current branch;
a third current branch comprising a third diode;
a first amplifier having a first input node coupled to the series circuit, a second input node coupled to the second diode, and a first output node coupled to the first current branch and to the second current branch; and
a second amplifier having a third input node coupled to the third diode, a fourth input node coupled to one of the first input node and the second input node of the first amplifier, and a second output node coupled to an output of the interface circuit, wherein the second amplifier comprises a transconductance amplifier.

15. The temperature sensing circuit of claim 14, further comprising:
a second resistor coupled between the first input node of the first amplifier and the third diode; and
a third resistor coupled between the second input node of the first amplifier and the third diode.

16. The temperature sensing circuit of claim 14, wherein the interface circuit comprises a transistor having a first load path node coupled to the first current branch and the second current branch, and a second load path node coupled to the output of the second amplifier.

17. The temperature sensing circuit of claim 14, wherein the interface circuit comprises a current mirror.

18. The temperature sensing circuit of claim 14, wherein the first output node of the first amplifier is configured to provide a temperature stable bandgap voltage.

19. The temperature sensing circuit of claim 18, further comprising a voltage to current converter circuit having an input coupled to the temperature stable bandgap voltage and an output coupled to the third current branch.

20. The temperature sensing circuit of claim 14, further comprising a sample and hold circuit coupled to an output of the first amplifier.

21. The temperature sensing circuit of claim 20, wherein chopping is applied to at least one of the first amplifier and the second amplifier.

22. The temperature sensing circuit of claim 21, wherein the first diode, the second diode and the third diode each comprise a diode connected transistor.

23. The temperature sensing circuit of claim 21, further comprising an analog to digital converter having an input coupled to an output of the interface circuit.

* * * * *